Dec. 23, 1969  C. H. DEDERICK  3,486,050
ELECTRIC MOTOR
Filed Oct. 3, 1966

Inventor
CLINTON H. DEDERICK
By *[signature]*
Attorney

United States Patent Office 3,486,050
Patented Dec. 23, 1969

3,486,050
ELECTRIC MOTOR
Clinton H. Dederick, Brentwood, Mo., assignor to Emerson Electric Co., St. Louis, Mo., a corporation of Missouri
Filed Oct. 3, 1966, Ser. No. 583,646
Int. Cl. H02k 5/16, 7/08
U.S. Cl. 310—90
10 Claims

ABSTRACT OF THE DISCLOSURE

An electric motor has an end bell, a wound stator, a rotor supporting shaft secured at its inner end to the end bell, and a rotor assembly, including a single bearing, rotatably mounted on the shaft. The bearing is prismatic and is pressed into a cylindrical cup having a sealed forward end. A double baffle at the rearward end of the cup prevents spilling and splattering of oil from that end. Wicking extends axially, between the cup and the flat sides of the bearing, from one end of the bearing to the other. The rotor assembly and shaft are assembled before the shaft is secured to the end bell. The rotor assembly and wound stator are preferably temporarily secured to each other by shims, and the shaft and wound stator secured to the end bell concurrently.

---

This invention relates to electric motors and in particular to motors having a fixed rotor shaft supported at only one end by the stator frame.

One of the objects of this invention is to provide such a motor which is permanently self-lubricating;

Another object is to provide such a motor which has an accurately aligned air gap;

Still another object of this invention is to provide such a motor which is easy to manufacture, rugged, compact, and quiet in operation.

Other objects will become apparent to those skilled in the art in the light of the following description and accompanying drawing.

Motors having a fixed rotor shaft and a rotor which contains its own oil supply have been known heretofore. Such a motor is shown in Lautner No. 2,904,709. These motors, however, have had to be sealed at both ends of their rotors against leakage of oil, have therefore had relatively small oil reservoirs, have not lent themselves to very efficient seals or baffles at the stator frame end of the rotor, and have been rather difficult to assemble. One aspect of their assembly, aligning the shaft, has been facilitated by the use or resins to secure the shaft to the frame while it is held in place by a dummy rotor, as shown in Anderson No. 3,209,434, but other problems remain.

In accordance with this invention, generally stated, a motor with a stator, a rotor and a stationary rotor supporting shaft supported at only one of its ends by the stator frame is provided in which the rotor contains only a single bearing. The shaft and the rotor core, including a bearing and a complete lubrication system are preassembled before the shaft is secured to the stator frame. The rotor assembly incudes an elongated unit bearing and a cup which fits over the bearing at the outer end of the shaft and the bottom end of which forms an oil reservoir. Two different baffle means at the inner end of the shaft connected respectively to the shaft and to the cup prevent leakage of oil at the inner end of the shaft at any orientation of the motor.

Figure 3:
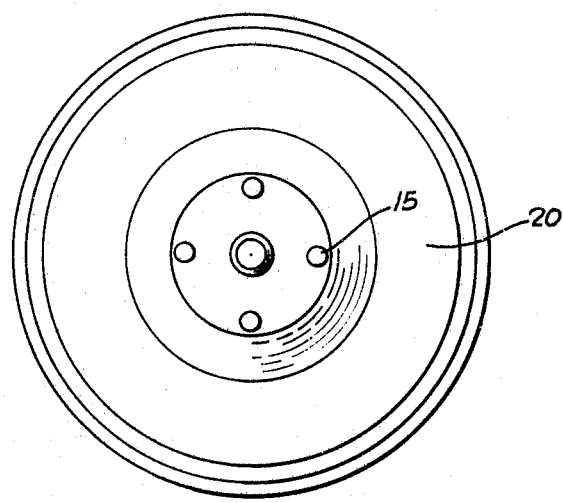
Figure 1:
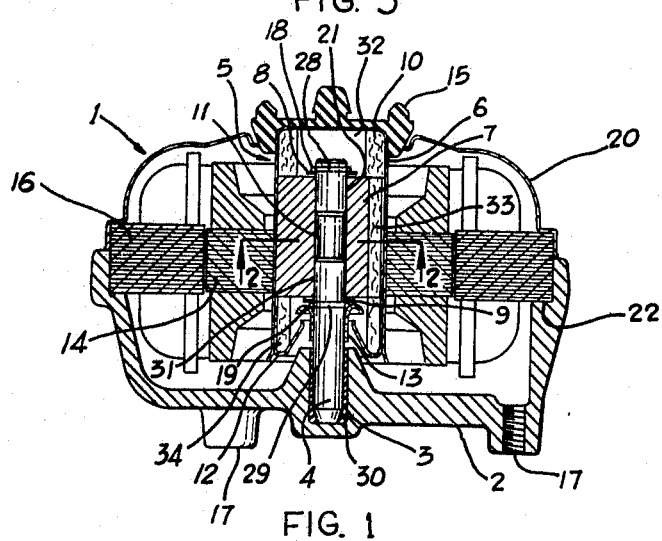
Figure 2:
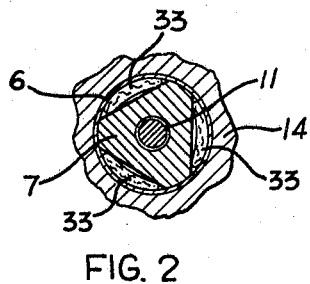

In the drawings, FIGURE 1 is a sectional view taken along the axis of rotation of one embodiment of electric motor of this invention;

FIGURE 2 is a partial view in cross section taken along line 2—2 of FIGURE 1; and FIGURE 3 is a view in front elevation of the motor shown in FIGURES 1 and 2.

Referring now to the drawings for one illustrative embodiment of motor of this invention, reference numeral 1 indicates an electric motor. A heavy end bell 2 of the motor 1 has a circular stator core receiving seat 22 and a central boss with a socket 3 in it. The socket 3 is concentric with the seat 22 and of a diameter to receive loosely one end of a stationary shaft 4 on which is mounted a rotor assembly 5. The space in the socket between the shaft and the wall defining the socket is filled with epoxy resin or other cementing material 30, by which the end of the shaft is permanently mounted in the socket. The rotor assembly 5 includes a thin cup 6 permanently sealed at its bottom; a triangular prism shaped sintered bearing 7 with an axial shaft receiving bore, held snugly within the cup and rotatably mounted on the shaft intermediate the ends of the shaft; washers 8 and 9 on the shaft 4 at the axially outer and inner faces of the bearing 7; lock washers 18 and 19, held in annular grooves 28 and 29 in the shaft 4, restraining the bearing 7 and the washers 8 and 9 from axial movement along the shaft 4; a loop of wicking 10 seated coaxially with the cup between the outer end of the shaft bearing 7 and the bottom of the cup 6; three strips of wicking 33 extending along and between the three sides of the bearing 7 and the inner wall of the cup 6 through the full length of the bearing; another loop of wicking 34 between the inner end of the bearing 7 and the mouth of the cup; a baffle ring 13 mounted on the shaft 4 within the cup 6; a baffle cap 12 mounted on the inside wall of the cup 6 near its mouth, and a rotor 14, mounted securely on the outside of the cup 6. An annular relief 11 in the shaft 4 leaves two bearing surfaces 21 and 31 between the shaft 4 and the bore-defining wall of the bearing 7. As is apparent from the drawing, the stationary baffle 13 has a radially outwardly curled lip, and the cap baffle 12, a radially inwardly re-entrant flange. The radially outer edge of the lip of the stationary baffle 13 extends radially outboard of the radially inner edge of the flange of the rotating baffle 12. Therefore, the inner end of the assembly is well protected from dust and the like, and is leakproof at any orientation of the motor.

The rotor may be a conventional squirrel cage type.

In the embodiment shown, a resilient cap 15 is glued or otherwise adhered to the outside wall of the cap at the bottom of the cup 6. The resilient cap 15 is provided with resilient lugs for mounting a fan or coupling to some other device to be driven.

The end bell 2 is provided with internally threaded mounting holes 17. A stator 16 is seated and permanently mounted in the seat 22.

The motor may be assembled as follows: The lock washer 18 is fitted into its groove 28 then the washer 15, the bearing 7, and the washer 9 are slipped onto the shaft 4, and the lock washer 19 is snapped into its groove 29. The stationary baffle 13 is then pressed in place on the shaft 4. The baffle 13 may be held in place simply by a friction fit, but the joint should be made tight enough to prevent oil leakage between the baffle 13 and the shaft 4, as by sealing the joint with a small amount of cementing material. The cup 6 is press fitted into the rotor 14. The outer loop of wicking 10 is dropped into place in the cup. The pre-oiled bearing assembly is then press fitted into the cup, and the three strips of wicking 33 are then dropped in. The cap-baffle 12 is then fitted with its loop of wicking and press fitted into the cup 6 at its mouth. This again may be a friction fit, but this junction should also be sealed against leakage.

The shaft receiving socket 3 is then partially filled with the adhesive 30. The rotor is positioned in the bore of the stator by means of thin shims in the air gap between the rotor and the bore-defining wall of the stator, by which shims the rotor is temporarily held in place. The combined rotor assembly and wound stator are press fitted into the seat 22 in the end bell 2 and the shaft 4 is concurrently inserted into the socket 3. The adhesive 30 is cured, and the shims removed. The protective cover 20 is then secured to the stator core, and the drive mounting means 15 secured to the outer end of the cup 6. The stator may be held only by its press fit in the seat 22, or may also be held with adhesive.

It will be seen that since the bottom of the cup 6 is permanently sealed, and in fact is entirely seamless, a large oil chamber 32 has been provided. This chamber may be charged with oil before the rotor core is assembled, or the large loop of wicking 10 may be soaked in oil. Regardless of the orientation of the motor 1, any oil which finds its way to the inner end of the bearing 7 will be prevented from escaping from the inner end of the assembly by the baffles 12 and 13, and will be guided to the wicking by the baffles. Since the baffle 13 is stationary, any oil which finds its way down the shaft 4 beyond the inner bearing surface 31 will merely drip off the baffle 13 onto the wicking 34, without spattering or oxidizing. Because of the novel construction of this motor, the rotor baffle 12 can radially overlap the stationary baffle 13 and thus further protect against oil leakage, dust, and so on. The bearing 7 is preferably made of sintered bronze, vacuum impregnated with oil.

An advantage of the illustrative embodiment of this motor is that the size of the motor can be changed with only a few changes in its components. If the rotor 14 and stator 16 are to be lengthened, within wide limits, the only other change in the motor is that the axial width of the loop of wicking 10 is increased. The bearing and shaft assembly is again inserted into the cup 6 until it touches the wicking 10, and the baffle 12 is inserted that much less deeply into the cup 6.

It will be seen that a motor is provided with a unit bearing and a highly efficient lubricating system which rotates with the rotor, is entirely sealed at one end, has a large oil reservoir at that end outside the bearing, and has end, has a large oil reservoir at that end outside the bearing, and has an extremely effective baffle system at the other end of the rotor. The entire motor is simple to manufacture, easy to assemble, accurately aligned, and once assembled is long lived and tamper proof.

Numerous variations in the construction of the electric motor of this invevntion within the scope of the appended claims will occur to those skilled in the art in the light of the foregoing discolsure. For example, in assembling the motor, the stator could be mounted in the end bell before the rotor assembly is inserted, though the preferred method has clear adavntages. The bearing can be made square or otherwise symmetrically polygonal.

Having thus described the invention, what is claimed and desired to be secured by Letters Patent is:

1. In an electric motor having an end bell, a stator fixed with respect to said end bell, a stationary rotor supporting shaft supported at only an axially inner end by said end bell, and a rotor assembly rotatably mounted on said shaft, said rotor assembly including a rotor radially within the compass of said stator and lubricating means enclosed in said rotor assembly, the improvement comprising a single bearing connected to and radially within the compass of said rotor assembly for rotation with said rotor assembly, said bearing having a central bore rotatably receiving said shaft, said shaft and bearing constituting the sole radial bearing support for said rotor, said bearing having a plurality of outer faces extending axially thereof from the axially inner to the axially outer end of said bearing, said lubricating means extending radially outboard of said outer faces.

2. The improvement of claim 1 wherein the bearing is made of sintered material, said lubricating means including strips of lubricant-carrying wicking contacting said outer faces.

3. The improvement of claim 1 wherein said rotor assembly includes a cup with a closed end at the axially outer end of the assembly and a side wall interposed between the bearing and rotor, said lubricating means being contained within said cup.

4. The improvement of claim 3 wherein parts of said lubricating means within the cup extend axially beyond both ends of said bearing, said parts of said lubricating means beyond the ends of said bearing communicating with each other through channels defined by said outer faces of said bearing and said side wall of said cup.

5. The improvement of claim 3 wherein a baffle means is fixedly secured to the stationary rotor supporting shaft between the end of said shaft supported by said end bell and said bearing, said baffle means being axially within the compass of said cup.

6. The improvement of claim 5 wherein a baffle means is provided on and in said cup at a position axially between the end of said shaft supported by said end bell and said baffle means fixedly secured to said shaft.

7. The improvement of claim 6 wherein said baffle means fixedly secured to said shaft and said baffle means in said cup overlap radially.

8. The improvement of claim 3 wherein a resilient drive mounting means is mounted on the outer end of said cup.

9. An electric motor having an end bell, a stator fixed with respect to said end bell, a stationary shaft supported at only an axially inner end by said end bell, a rotor rotatably mounted on said shaft radially within the compass of said stator, bearing means mounted radially within said rotor and in fixed relation thereto, said bearing means having an axial bore rotatably receiving said shaft, a cup, said cup comprising a side wall interposed between said bearing means and said rotor and an end wall integral with said side wall, said end wall extending radially across said shaft axially beyond an axially outer end of said shaft, and lubricating means within said cup axially between said bearing means and said end wall, whereby said cup provides a jointless closure for said lubricating means at said axially outer end of said shaft.

10. An electric motor having an end bell, a stator fixed with respect to said end bell, a stationary shaft supported at only an axially inner end by said end bell, a rotor assembly rotatably mounted on said shaft radially within the compass of said stator, said rotor assembly including a rotor and a bearing means, a fixed baffle means fixedly secured to said shaft axially between the end of said shaft supported by said end bell and said bearing means, and rotating baffle means on said rotor assembly, said fixed baffle means having a radially outwardly extending lip, and said rotating baffle means having a radially inwardly re-entrant flange, said lip extending axially between said bearing means and an axially inner edge of said flange, and extending radially outboard of a radially inner edge of said flange, whereby lubricant following said shaft axially inward drips from said lip and falls into said rotor assembly at all orientations of said motor.

(References on following page)

References Cited

UNITED STATES PATENTS

| | | | |
|---|---|---|---|
| 1,043,741 | 11/1912 | Tetlow | 308—115 |
| 1,816,507 | 7/1931 | Wilde | 308—134.1 |
| 2,067,155 | 1/1937 | Levy et al. | 310—90 |
| 2,947,893 | 8/1960 | Bussone | 310—90 |
| 3,250,932 | 5/1966 | Tupper | 310—90 |
| 2,571,672 | 10/1951 | Bradley | 310—90 |
| 2,685,658 | 8/1954 | Feiertag | 310—90 |
| 2,904,709 | 9/1959 | Lautner | 310—90 |
| 3,387,153 | 6/1968 | Grad | 310—90 |
| 3,081,411 | 3/1963 | Wiley | 310—90 |

MILTON O. HIRSHFIELD, Primary Examiner

GERALD P. TOLIN, Assistant Examiner

U.S. Cl. X.R.

310—157